United States Patent
Chiesa

[15] 3,693,522
[45] Sept. 26, 1972

[54] AUTOMATIC COUNTER-ACTUATED APPARATUS FOR TAKING AND DEVELOPING PHOTOGRAPHS

[72] Inventor: Luigi Chiesa, Turin, Italy
[73] Assignee: Morena S.A., Fribourg, Switzerland
[22] Filed: May 21, 1971
[21] Appl. No.: 145,730

[30] Foreign Application Priority Data

May 23, 1970 Italy.....................68775 A/70

[52] U.S. Cl. .............................95/14, 95/18, 355/54
[51] Int. Cl. ...............................................G03b 17/50
[58] Field of Search........95/14, 18, 36 R, 37; 355/54

[56] References Cited

UNITED STATES PATENTS

| 2,541,016 | 2/1951 | Allen.............................95/14 |
| R26,771 | 1/1970 | Schwardt et al.............355/54 |
| 1,734,780 | 11/1929 | Simjian..........................95/37 |
| 3,504,607 | 4/1970 | Bok........................95/36 R X |
| 3,283,685 | 11/1966 | Cummins...............95/36 R X |

Primary Examiner—Samuel S. Matthews
Assistant Examiner—Richard L. Moses
Attorney—Wenderoth, Lind & Ponack

[57] ABSTRACT

Coin-operated apparatus for photographing a person in a cubicle and developing the photograph has two cameras, a first one for taking a single large photograph and a second one for taking four small photographs, a reel of reversible paper which passes through first one camera and then the other camera, two slide projectors to hold photographic slides for photographing in two of the four small photographs and program selectors. The second camera has four separate lens assemblies and four screened-off compartments. Program selector means provides for selection of either a single large photograph or four small photographs of the person or two photographs of the person and two photographs of the slides or two photographs of the person and two blank spaces.

9 Claims, 13 Drawing Figures

INVENTOR
LUIGI CHIESA
BY
ATTORNEYS

AUTOMATIC COUNTER-ACTUATED APPARATUS FOR TAKING AND DEVELOPING PHOTOGRAPHS

The present invention relates to the automatic instruments, which may be actuated by insertion of a coin or token, for taking and developing photographs, of the type comprising a cubicle accessible to the user, and a cabinet adjacent to the cubicle and containing means for exposing a usually rectangular portion of a reversible paper, means for lighting the subject, means for selectively obtaining one or more photographs from the same portion of paper, means for developing the aforesaid paper and of issuing the developed photograph to the user.

The known instruments of the aforesaid type are of complex and unwieldly structure and uncertain operation, and offer a very small number of programmes in respect of the kinds of photographs the user can obtain.

For the purpose of eliminating the aforesaid shortcomings, the present invention has as its object an apparatus of the type defined, which has a simple and compact structure, precise and reliable operation and is arranged to provide a wide range of programmes covering the different kinds of photographs it is possible to obtain.

Another object of the invention is that of producing an apparatus of the aforesaid type, which is arranged to provide, in selective manner, portraits of large size, photographs of small size, repeat prints or photographs usable for official identity documents.

Another object of the invention is to produce an apparatus of the aforesaid type, which offers a high degree of automation and is equipped with safety devices arranged to prevent damage to its elements in case of anomalous operation.

Another object of the invention is to produce an apparatus of the aforesaid type, which operates without attention for long periods and thus requires very little maintenance work.

The principal feature of the apparatus according to the invention resides in the fact that, in combination with means of performing the developing operation and of issuing the photograph, it comprises a photographic assembly made up of a reel supplying the reversible paper, two separate superposed cameras, of which one is equipped with a single objective apt to take a single photograph of the same size as the portion of reversible paper in question during each operating cycle, and the other bears four separate lenses operative in four screened-off compartments in such manner that the paper is exposed simultaneously or at different times, obtaining a plurality of smaller photographs from the same, means of producing programmed images on a part of the paper square and leaving the remaining part unexposed to take the photograph of the subject, lighting means situated in the second camera for exposing a part of the paper square to white light, leaving the remaining part unexposed for taking photographs of the subject, means of causing the paper to advance along the two aforesaid photographic cameras of withdrawing the same from the photographic assembly and of feeding it to the developing means, means of severing the square of exposed paper from the rest of the web, means of subsequently exposing the paper to produce the border of the photograph or photographs to be taken, and programming means which are selectively applicable by means of an external coin or token insertion mechanism, for selection of the operating cycles of the means specified as a function of the kind of photograph preselected by the user.

Further features and advantages of the invention will emerge from the following detailed description, with reference to the accompanying drawings provided by way of non-limiting example, in which.

Figure 2:
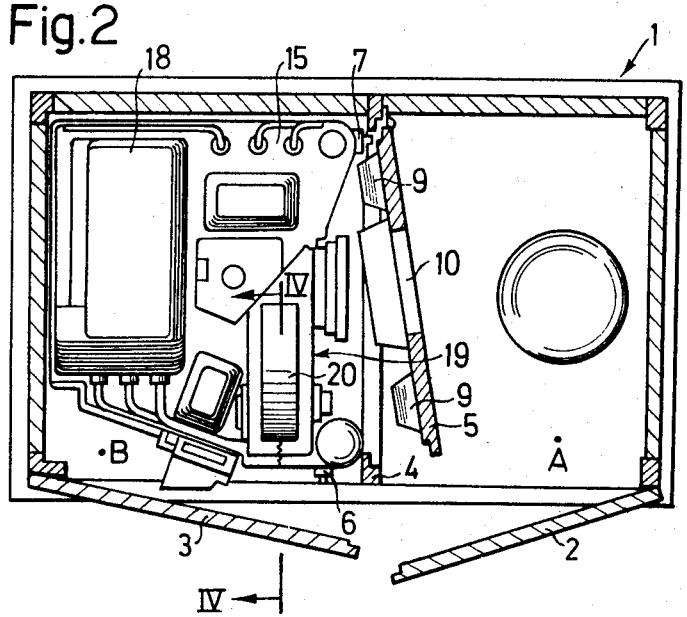
FIG. 2 is a diagrammatical cross-section thereof, taken along the line II—II of FIG. 1.
Figure 3:
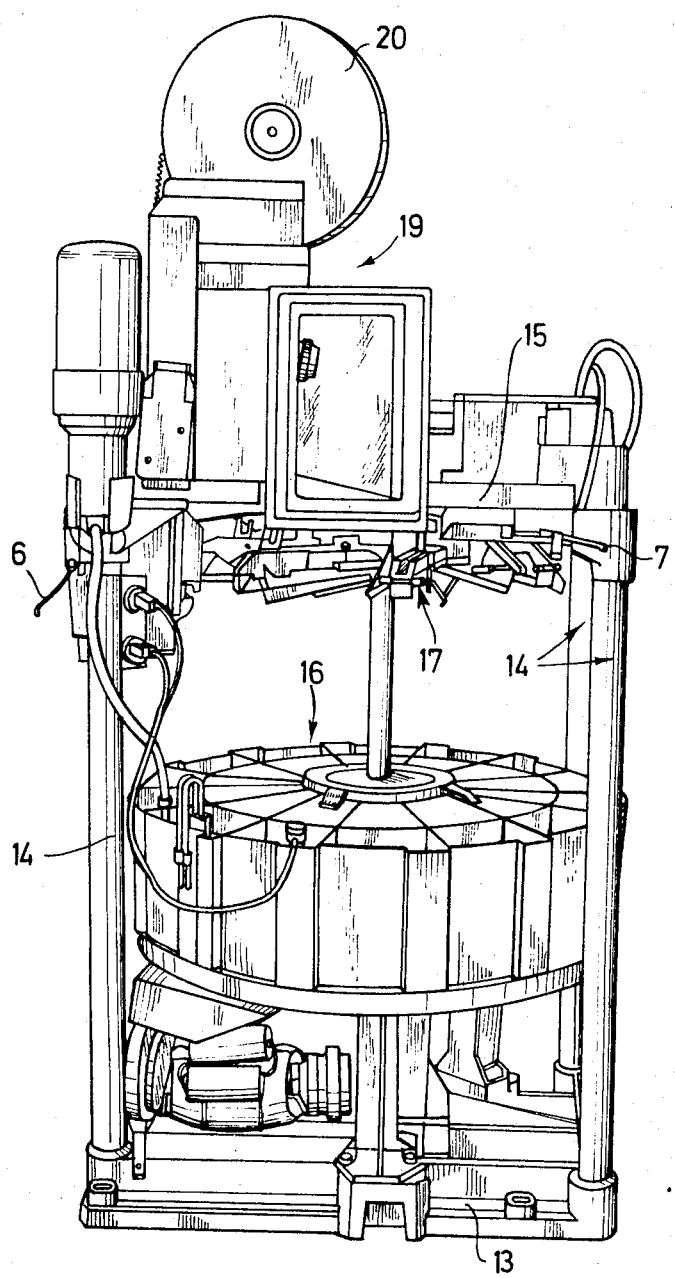
FIG. 3 is a view in perspective of the internal operative assemblies of the apparatus.
Figure 4:
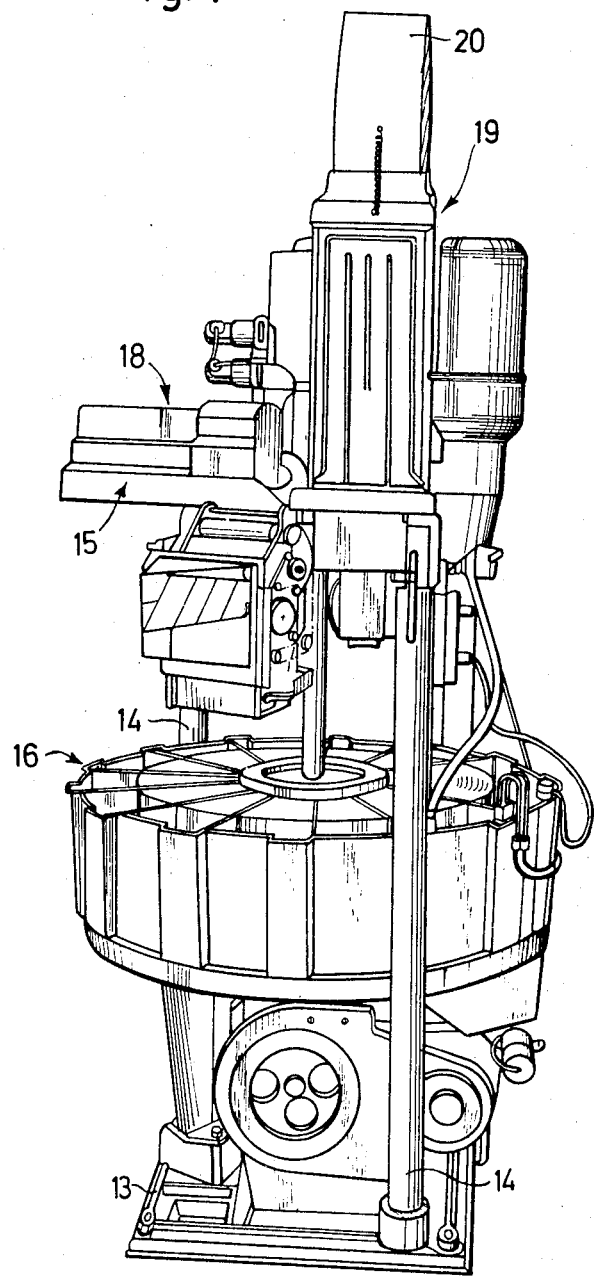
Figure 5:
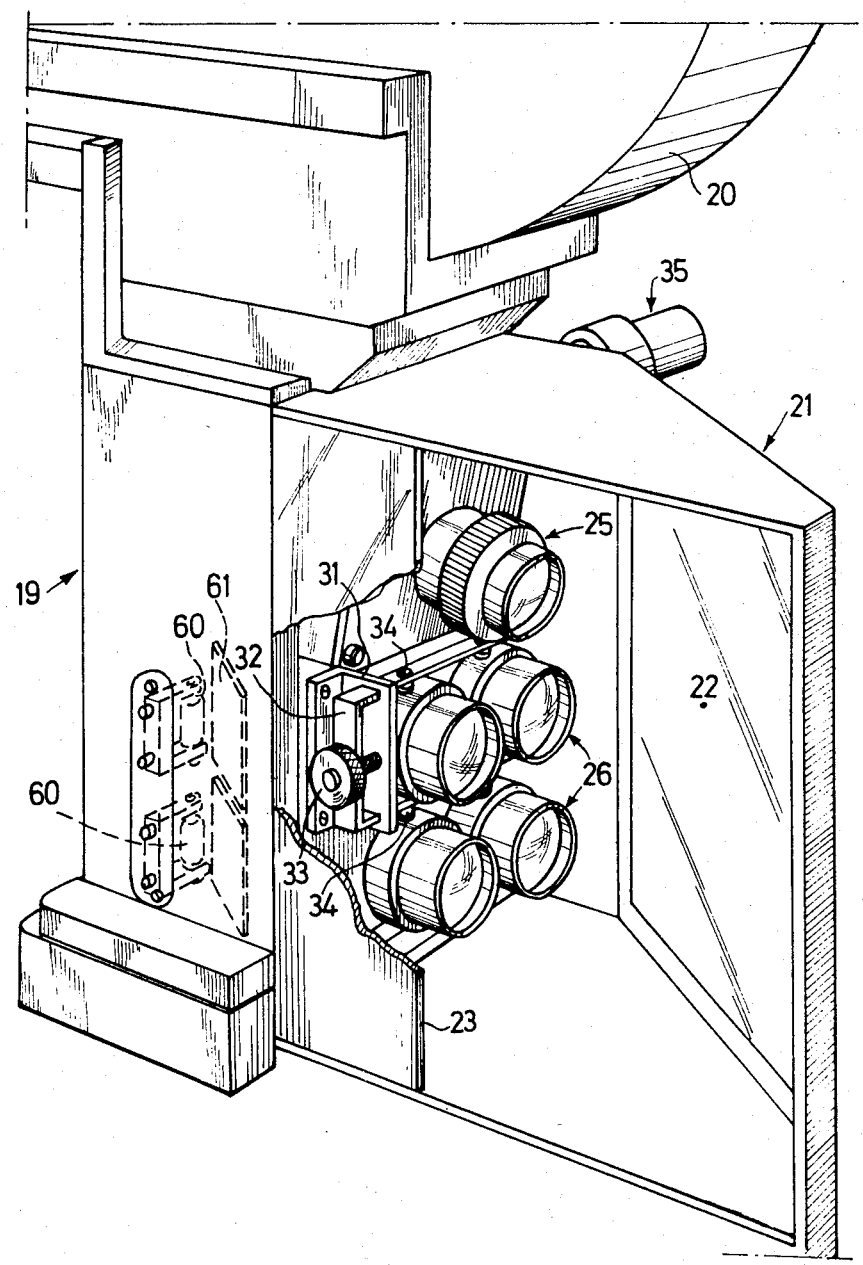
Figure 6:
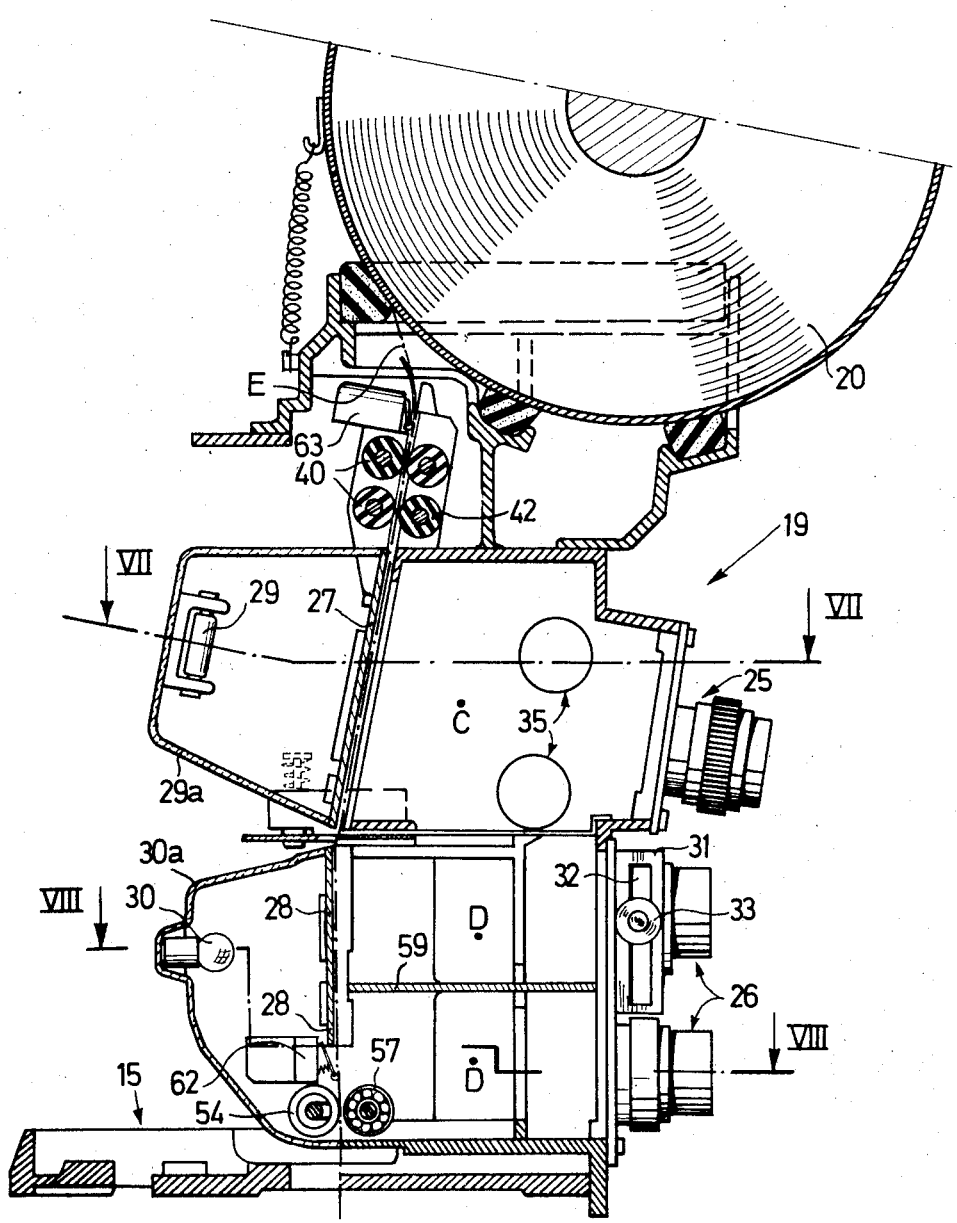
Figure 7:
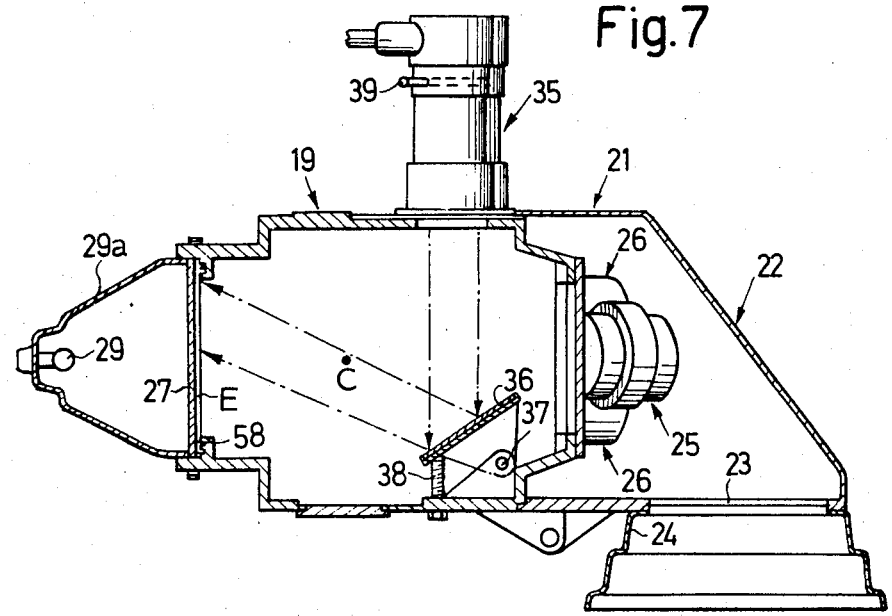
Figure 8:
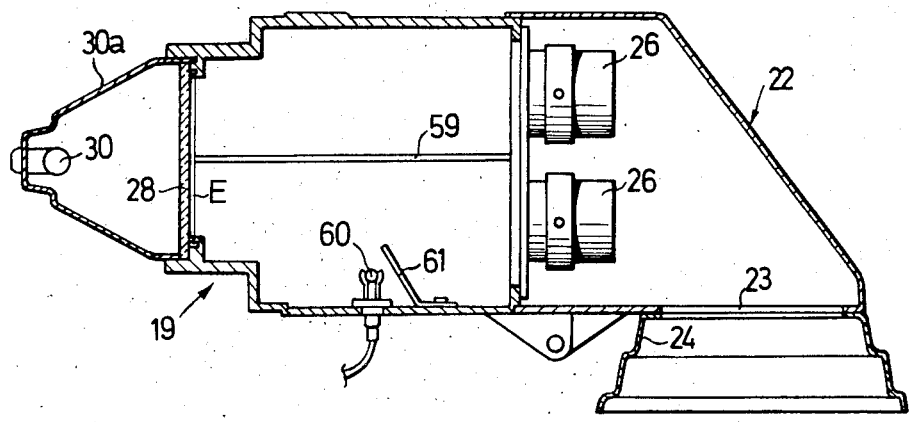
Figure 10:
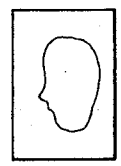
Figure 11:
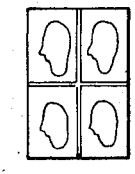
Figure 12:
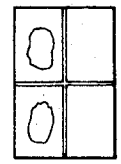
Figure 13:
Figure 9:
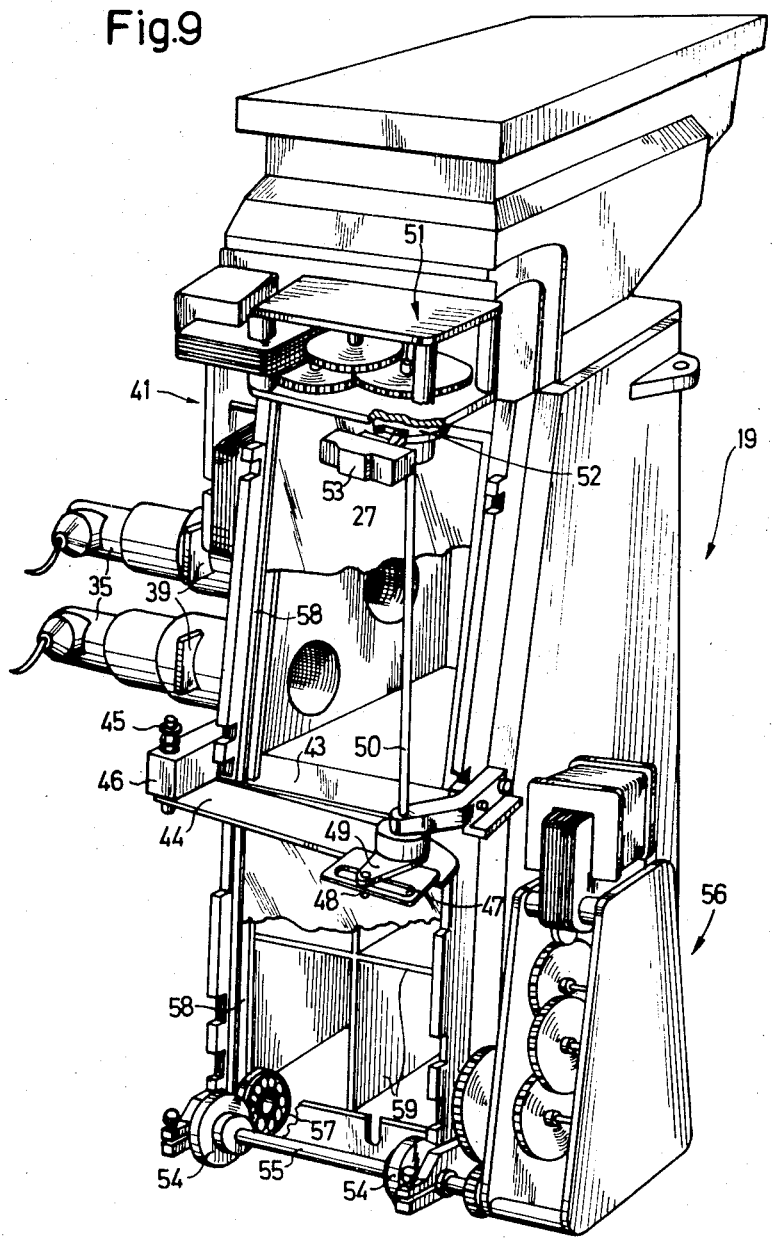

FIG. 4, analogous to FIG. 3, is another view in perspective as seen from a different angle;

FIG. 5 is a partially sectioned and enlarged-scale diagrammatical view in perspective of the photographic assembly;

FIG. 6 is a longitudinal section of the photographic assembly taken along the line VI—VI of FIG. 2;

FIGS. 7 and 8 are two enlarged-scale cross-sections taken along the lines VII—VII and VIII—VIII of FIG. 6;

FIG. 9 is a rear view in perspective of the photographic assembly, and

FIGS. 10, 11, 12 and 13 are four diagrammatical plan views illustrating different types of photographs obtainable from the apparatus.

Figure 1:
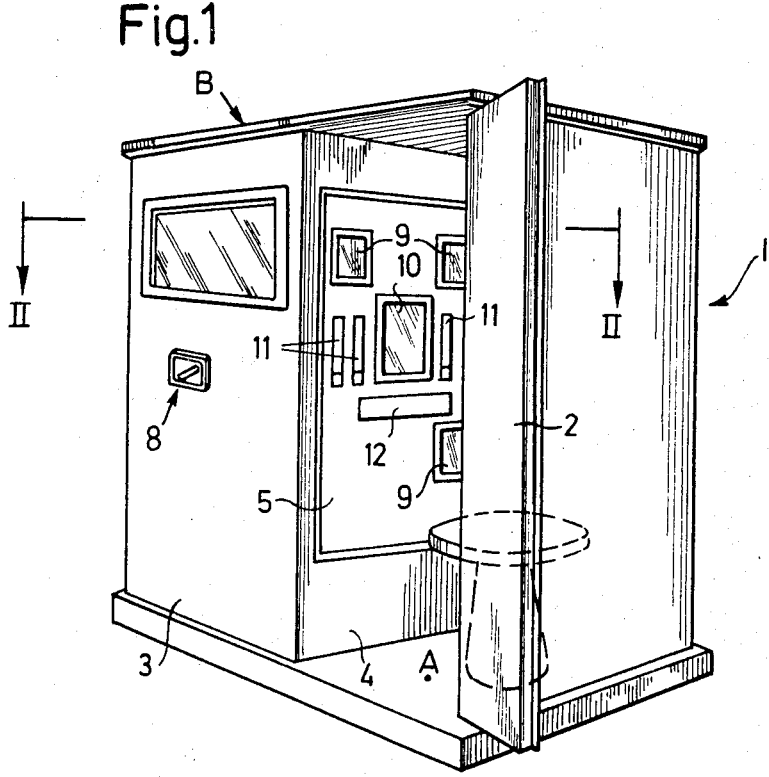
FIG. 1 is a view in perspective of an automatic coin or token operated apparatus for taking and developing photographs according to the invention.

With reference to FIGS. 1 and 2, 1 marks a piece of furniture enclosing the automatic photographic apparatus according to the invention; this piece of furniture comprises a compartment or cubicle A accessible from the outside through a door 2 and forming a cubicle or cabin, and a cabinet B closed off by an outer door 3 and separated from the cubicle A by means of a partition 4 equipped with an opening partitioning panel 5. The outer door 3 and the opening panel 5 co-operate with safety switches 6,7 which interrupt the current fed to the internal items of equipment when access is to be gained to the cabinet B.

On the outer door 3 is arranged a bowl or tray 8 from which the user draws the photograph or photographs obtained with each functional cycle of the machine.

On the panel 5, which separates the cubicle A from the cabinet B, are situated a plurality of incandescent bulbs 9 capable of supplying the lighting needed to take the photographs, a central window 10 covered by a transparent screen which is not liable to lose transparency, through which the photograph of the subject is taken, a plurality of coin or token insertion devices 11 of which each controls one or more functional programmes of the apparatus, and a sight panel 12 bearing a plurality of light signals which may indicate the stage of progression of the operating cycle or the functional state of the apparatus.

Within the internal space of the cabinet B is situated, as apparent from FIGS. 3 and 4, a supporting frame comprising a bottom plate 13, a plurality of vertical uprights 14 and a top plate 15, positioned horizontally and consisting of a variety of elements co-operating with each other. The bottom plate carries a set of basins or tanks 16 for development, reversal and fixing of the reversible paper and a set of displaceable elements 17 arranged for conveying the paper.

On the top plate 15 are situated an electrical assembly 18 comprising almost all the electrical parts of the machine and the programming devices, and a photographic assembly 19 topped by a cylindrical box 20 wherein is situated a supply reel for feeding the reversible paper E in the form of a continuous web or tape.

To the photographic assembly 19, which is contained in a frame formed by different elements co-operating with each other, is connected at the front a prismatic extension 21 carrying a mirror 22 sloping at 45° and a lateral window 23 surrounded by a shaped or moulded frame 24 which, in the assembled position coincides with the window 10 of the front panel 5 of the piece of furniture.

The photographic assembly 19 comprises two separate superposed photographic cameras C, D, one of which, C, has a single objective lens 25, and the other of which, D, has four separate lenses 26, operative in four separate spaces divided from each other by cruciform screens 59. At the rear, the two photographic cameras are closed off by sheets or panes of transparent material 27 and 28, which are blackened for the most part and bear transparent areas intended to enframe the large photograph or the smaller ones produced on a single square of reversible paper E. The panes 27, 28 are situated close to opposed guides 58 along which the paper slides. Behind the aforesaid panes are situated two incandescent bulbs 29 and 30 contained in enclosing cowlings 29a, 30a, arranged for exposure of the paper from behind to produce the aforesaid borders of the photographs.

The main lens assembly 25 of the upper camera is equipped with its own means of setting the diaphragm, whereas in the case of the lower lens assemblies 26 the diaphragms are actuated simultaneously by a sliding U-shaped stirrup 32 borne by a lateral plate 31 and controlled by a small screw-type wheel 33; this plate 31 has its two parallel branches in engagement with a plurality of lugs 34 in unit with the rotary diaphragms of the lens assemblies (as seen in FIG. 5).

The shutters of the different lens assemblies are controlled by electromagnets in manner known per se.

In correspondence with the upper camera C are laterally arranged two slide projectors 35, arranged to expose a part of the square of reversible paper, projecting on to said part two transparencies carried by interchangeable slides 39 inserted into these projectors. As shown in FIG. 7, each of these projectors co-operates with an angled mirror 36 situated within the photographic camera C and arranged to pivot around a vertical spindle 37; this mirror is controlled by means of an adjusting screw 38.

Within the lower photographic camera D there are arranged at one side (see FIGS. 5 and 8) two incandescent bulbs 60 one above the other, and covered by opaque screens 61 turned towards the lateral lens assemblies and arranged to effect exposure to white light of a part of the square of reversible paper which is placed in the aforesaid camera.

The advance of the web of reversible paper is operated by two feed assemblies, of which one is situated above the first photographic camera C and the other is situated at the exit of the lower photographic camera D. The upper feed assembly comprises two driving rollers 40 driven in the same direction of rotation by a geared electric motor 41 arranged externally to the assembly, and co-operating with two thrust rollers 42 situated internally.

The second feed assembly comprises two driving rollers 54 arranged on one and the same horizontal spindle 55, driven by an analogous external geared electric motor 56 and co-operating with a pair of idle thrust rollers 57 arranged at the inner side of the photographic camera. In correspondence with the area of separation between the two photographic cameras are arranged means of cutting the paper comprising a stationary cutter 43 and a displaceable cutter 44, hinged on a vertical spindle 45 borne by a hanger or bracket 46. At its free extremity, the displaceable blade carries a portion provided with a slot 47 in which is engaged in the manner of a link coupling a peg 48 borne by a crank 49 operated through a long vertical spindle 50 by means of a geared motor 51. The spindle 50 bears a cam 52 arranged to operate a miniature switch 53 which stops the operation of the geared motor 51 after the cutting operation has been performed, and the displaceable blade is returned to the open position to allow of subsequent feed of the paper.

Close to the second feed assembly is arranged a miniature switch 62 FIG. 6 which is actuated by the paper to stop its advance: this occurs after the paper is grasped by the rollers 54, 57 and establishes the precise length of the portion of paper to be exposed.

Above the first feed assembly is situated another miniature switch 63 which is energized while the paper web is present: in the absence of this web, the miniature switch is de-energized, interrupts the operation of the apparatus and actuates an optical warning signal.

The operation of the apparatus described is the following:

When the reel of reversible paper is loaded, the operative inserts the free extremity of the web between the rollers of the first feed assembly, which are set in rotation by the operative and carry the paper to the level of the second assembly: the cutting mechanism is then actuated, which cuts off the portion of paper situated below itself and the lower rollers 57, 54 cause the ejection and removal of the severed portion from the lower photographic camera. The machine is thus readied to perform the first operating cycle with the sensitized paper already positioned abreast of the upper photographic camera C.

If the user intends to obtain a single large photograph (FIG. 10) and consequently operates the corresponding coin or token reception device, the programming devices establish the following cycle : ignition of the rear incandescent bulb 29 to perform the exposure of the border of the square of paper, ignition of the light bulbs 9 to light the subject, opening of the shutter of the lens 25, actuation of the upper feed assembly to carry the paper web into a position of engagement in the lower assembly, actuation of the cutting device and actuation of the lower feed assembly which conveys the exposed paper to the developing devices which are not illustrated.

If the user selects the programme for performing the exposure of four smaller photographs instead (FIG. 11), the following automatic cycle is established : ignition of the upper bordering or border-exposing bulb 29, actuation of the upper feed assembly to carry the paper web from the upper camera C to the lower camera D, ignition of the rear bulb 30 to produce the outlines of the four photographs, ignition of the bulbs 9, operation of the four lenses 26 at the same time or at different times, actuation of the cutting device and actuation of the lower feed assembly which conveys the severed square of paper to the developing devices.

If, instead, the user selects the program for taking two small photographs of the person in the cubicle coupled with making two photographs of previously taken subject matter such landscapes or views of other local nature subjects (see FIG. 12), the following cycle is established:

ignition of the upper bordering or border effecting bulb 29, actuation of the two projectors 35 which expose two portions of the square corresponding to two of the smaller photographs, actuation of the upper feed assembly to displace the square from the upper to the lower camera, ignition of the rear bulb 30 to expose the internal squares, ignition of the external bulbs 9, simultaneous or separate actuation of the two lateral lenses 26 corresponding to the two portions left unexposed, actuation of the cutting device and subsequent actuation of the lower feed assembly which ejects the severed square of paper.

If the user wished to obtain two small photographs flanked by blank spaces for use, for example, for issue or attachment of passports or the like (FIG. 13), the cycle is the following:

ignition of the upper bordering bulb 29, actuation of the upper feed assembly which carries the square to the lower photographic camera D, ignition of the rear bulb 30 to produce the inner borders, ignition of the two lateral bulbs 60 which effect exposure to white light of two portions of the square corresponding to two photographs, ignition of the external bulbs 9, simultaneous operation of two lower lens assemblies 26 which expose the paper producing two identical photographs of the subject situated abreast of the blank spaces obtained, actuation of the cutting device and then actuation of the lower feed assembly which ejects the exposed square.

In each of the aforesaid cases, the operating cycle also includes the actuation of the developing devices, which are preferably of a conventional form and have not been described, and of the devices which convey the developed and dried photograph to the user, into the external tray 8.

The photographic assembly described consists of a compact unit and the internal passages for the paper are carefully screened from the light, in such manner that the reversible paper is not damaged even in case it is left within the apparatus for a protracted period.

The principle of the invention evidently remaining unaltered, the methods of actuation and structural details may be changed considerably from those described and illustrated, without thereby exceeding the scope of the present invention.

I claim:

1. An automatic, token or coin operable apparatus for taking and developing photographs, said apparatus comprising a cubicle accessible to a person using said apparatus; a cabinet adjacent to the cubicle; lighting means to illuminate the person in the cubicle; said cabinet containing means to store reversible photographic paper in a reel; a composite camera assembly having means selectively operable to take either a single relatively large photograph of at least part of the person in the cubicle on a single relatively large picture-forming area of a leading end portion of the reel of paper, or a plurality of relatively small photographs on a plurality of spaced-apart relatively small picture forming areas of said portion of the paper such that at least a first-mentioned one of the relatively small photographs taken and developed herein is of at least part of the person in the cubicle; said composite camera assembly comprising two cameras of which one camera includes a single lens assembly and is adapted to take said single relatively large photograph, and the other camera has a plurality of separate lens assemblies; each of said separate lens assemblies of said other camera being cooperable with a respective one of a plurality of individual screened-off compartments in said other camera to produce respective relatively small photographs in said relatively small picture forming areas; means for illuminating a border area of said portion of the paper around said picture forming area of said portion of the paper; detaching means for detaching said leading end portion of the paper from the remainder of the reel of paper; developing means for developing, reversing and fixing said portion of the paper after the taking of each photograph and after the illumination of the respective border area or areas of said portion of the paper; and feed means automatically operable to feed said portion of the paper to the camera assembly and thence to the developing means and to deliver said portion after developing to a place where it can be removed by the person; said apparatus having means selectively operable by the person and including further means to form a photograph from at least one previously taken transparency or negative picture so that at least a second mentioned one of said relatively small picture forming areas of said portion can be selectively used; said apparatus including means for mounting said previously taken transparency in a predetermined position relative to a predetermined one of said cameras to enable producing of a photograph by said predetermined camera from the transparency, and means operable by the insertion of at least one coin or token having a predetermined value for effecting operation of said apparatus.

2. Apparatus as claimed in claim 1 wherein said two cameras are mounted in superposed relation.

3. Apparatus as claimed in claim 1 wherein said compartments and said one camera are so arranged that the relatively large picture forming area and the relatively small picture forming areas are each rectangular.

4. Apparatus as claimed in claim 1 wherein the lens assemblies of said other camera are four in number; the relatively small picture-forming areas of said portion of the paper are four in number; and said compartments in said other camera are four in number.

5. Apparatus as claimed in claim 4 wherein said other camera includes means selectively operable to cause a third-mentioned one of said relatively small picture forming areas to form a photograph of at least part of the said person, and to cause the fourth relatively small picture forming area to form a photograph from a second transparency or negative picture, and said apparatus including means mounting a second transparency or negative picture in a second predetermined position to enable said second photograph thereof to be made, such that said portion of the paper can have two photographs, each of at least part of the person within the cubicle, and additionally have two photographs made from said respective transparencies or negative pictures.

6. Apparatus as claimed in claim 4 wherein said apparatus includes means in said other camera selectively operable to cause a third-mentioned one of said four relatively small picture forming areas to form a photograph of at least part of the person in the cubicle and means to cause both the second-mentioned relatively small area and the remaining fourth relatively small area to be left blank.

7. Apparatus as claimed in claim 1 wherein said means for illuminating said border area of said portion of the paper around said picture forming area of said portion of the paper comprises two sheets each at the rear of a respective one of the cameras, each sheet being opaque in a region corresponding to said picture forming area and each sheet being transparent in a region corresponding to said border area, and a light behind each said sheet.

8. Apparatus as claimed in claim 1 wherein said further means to form a photograph from said at least one previously taken transparency comprises optical projector means for illuminating said transparency and for projecting an image of the transparency onto said second-mentioned one of said relatively small picture forming areas of said portion in said one camera independently of said single lens assembly and means for positioning said portion of the paper in said one camera for forming said photograph from said transparency the apparatus also comprising means for sequencing the taking of the photograph of the transparency with said portion of the paper positioned in said one camera, the taking of said first-mentioned one of the relatively small photographs with said portion of the paper positioned in said other camera and feeding of said portion of the paper from the first camera involved in the sequence to the second camera.

9. Apparatus as claimed in claim 8 wherein a mirror-like reflecting means is located within said one camera for reflecting said image of said transparency onto said second-mentioned one of said portion of said paper, said mirror-like means being located out of the path of light from said single lens assembly to said portion of said paper.

* * * * *